United States Patent [19]

Meyer

[11] 3,951,864

[45] Apr. 20, 1976

[54] HYDROCARBON CONVERSION CATALYST

[75] Inventor: Jarold A. Meyer, Concord, Calif.

[73] Assignee: Chevron Research Company, San Francisco, Calif.

[22] Filed: July 2, 1973

[21] Appl. No.: 376,026

Related U.S. Application Data

[60] Division of Ser. No. 314,044, Dec. 11, 1972, which is a continuation-in-part of Ser. No. 150,857, June 3, 1971, abandoned.

[52] U.S. Cl. .............................. 252/455 Z; 252/457
[51] Int. Cl.² ..................... B01J 29/06; B01J 29/00
[58] Field of Search ................................ 252/455 Z

[56] References Cited
UNITED STATES PATENTS

| 3,425,956 | 2/1969 | Baker et al. | 252/455 Z |
| 3,536,605 | 10/1970 | Kittrell | 252/455 Z |
| 3,598,719 | 8/1971 | White | 252/455 Z |

Primary Examiner—Carl F. Dees
Attorney, Agent, or Firm—G. F. Magdeburger; R. H. Davies; D. L. Hagmann

[57] ABSTRACT

A hydrocarbon hydroconversion catalyst comprising an alumina-silica-magnesia matrix containing a hydrogenation component, and a crystalline zeolitic molecular sieve substantially free of hydrogenation components, said catalyst having a specific gravity less than about 1.8, preferably 1.1 to 1.8.

4 Claims, 1 Drawing Figure

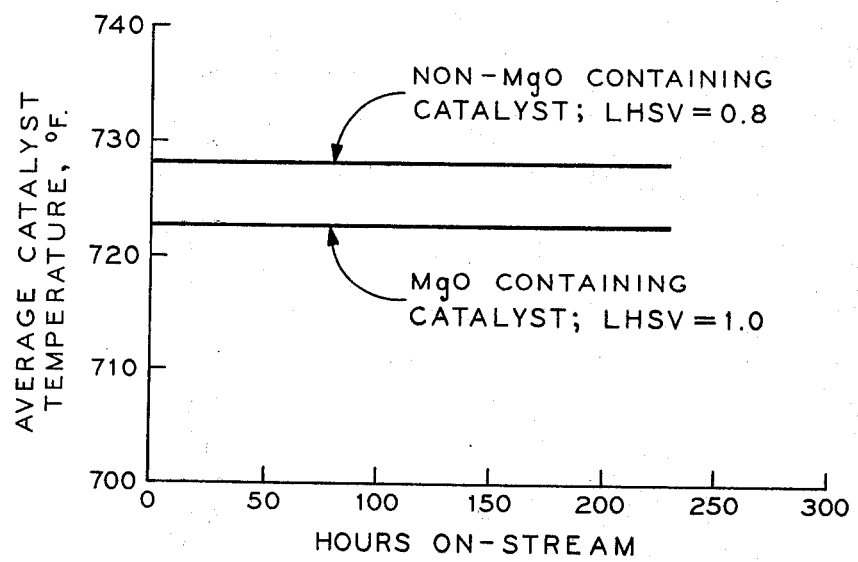

HYDROCARBON CONVERSION CATALYST

CROSS REFERENCE TO RELATED APPLICATION

This is a division of application Ser. No. 314,044, filed Dec. 11, 1972, U.S. Pat. No. 3,764,519, which is a continuation-in-part of U.S. application Ser. No. 150,857, filed June 3, 1974.

BACKGROUND OF THE INVENTION

This invention relates to processes for the hydroconversion of hydrocarbon feedstocks, specifically hydrocracking and hydrodenitrification processes, to produce high-value fuel products such as jet fuels and gasoline, and a novel catalyst for use in said processes.

The prior art, for example Plank et al. U.S. Pat. No. 3,140,253 discloses a catalyst comprising a crystalline zeolitic molecular sieve component associated with other catalyst components. Plank et al. U.S. Pat. No. 3,140,253, further discloses that at least some of the other catalyst components may be in the form of a matrix in which the molecular sieve component is disposed and that such catalysts may be used for catalytic cracking, hydrocracking, and hydrofining. Other prior art patents disclosing one or more of the foregoing matters include U.S. Pat. No. 3,140,251, British Pat. No. 1,056,301, French Pat. No. 1,503,063, and French Pat. No. 1,506,793. The prior art further shows use of silica-alumina-magnesia catalysts for cracking, hydrocracking, and hydrofining. The prior art does not, however, show the unique advantages obtainable, namely improved activity and stability, in hydrocarbon hydroconversion processes which comprise contacting a hydrocarbon feedstock and hydrogen with a catalyst comprising an alumina-silica-magnesia matrix containing a hydrogenation component and a crystalline zeolitic molecular sieve substantially free of hydrogenation components in a reaction zone at hydrocarbon hydroconversion conditions, the catalyst having a specific gravity less than about 1.8, preferably 1.1 to 1.8.

SUMMARY OF THE INVENTION

The invention is concerned with a hydrocarbon hydroconversion process comprising contacting a hydrocarbon feedstock and hydrogen with a catalyst comprising an alumina-silica-magnesia matrix containing a hydrogenation component and a zeolitic molecular sieve substantially free of hydrogenation components (unloaded) dispersed in the alumina-silica-magnesia matrix, in a reaction zone at hydrocarbon hydroconversion conditions, said catalyst having a specific gravity of less than 1.8, preferably about 1.1 to 1.8, and more preferably 1.2 to 1.7; and with the novel catalyst used in said hydrocarbon hydroconversion process.

Examples of hydrocarbon conversion processes in which the catalyst of the invention is useful include hydrocracking, isomerizing, reforming, and hydrofining, particularly hydrodenitrification, processes. Preferably, the catalyst is used in hydrocracking and hydrofining processes or combined single-stage hydrofining-hydrocracking processes.

BRIEF DESCRIPTION OF THE DRAWING

FIG. 1 illustrates starting and average run temperatures of single-stage combined hydrofining and hydrocracking processes using a comparison catalyst of the prior art and the catalyst of the present invention at pressures of approximately 2000 psig.

DETAILED DESCRIPTION OF THE INVENTION

This invention comprises a novel catalyst composition of matter and hydrocarbon conversion processes using this novel catalyst.

The catalyst of this invention consists of two components, as follows:

1. a matrix containing silica, alumina and magnesia and having associated with it at least one hydrogenation component; and
2. A crystalline zeolitic molecular sieve which is substantially free of any hydrogenation components.

The final catalyst is a mixture of the matrix component, the hydrogenation component and the crystalline zeolite component, such that the zeolite component is intimately dispersed throughout the matrix component.

The matrix component must contain silica, alumina and magnesia. Suitable compositions are within the following ranges, based upon the silica-alumina-magnesia content:

| Component | Minimum Wt. % | Maximum Wt. % |
|---|---|---|
| Silica | 2 | 96 |
| Alumina | 2 | 96 |
| Magnesia | 2 | 50 |

Preferred compositions, especially for hydrodenitrification and hydrocracking catalysts, are within the following ranges, bases upon the silica-alumina-magnesia content:

| Component | Minimum Wt. % | Maximum Wt. % |
|---|---|---|
| Silica | 20 | 60 |
| Alumina | 20 | 60 |
| Magnesia | 5 | 30 |

The matrix component also contains at least one hydrogenation component. Examples of useful hydrogenation components are metals of Group VI-B and Group VIII of the Periodic Table. Preferably the hydrogenation component is selected from the group consisting of nickel, cobalt, molybdenum, tungsten, palladium, platinum, compounds of these components, or combinations thereof.

The matrix component may also include other components. The matrix preferably also includes a Group IV-B component, i.e., titanium, zirconia, hafnia, or compounds thereof. The term "matrix" as used herein in defining weight percents of the various components refers to the silica-alumina-magnesia component of the catalyst. As discussed herein, a hydrogenation component is also present in the matrix.

If no noble metal hydrogenation component is used, the preferred amounts of the components fall within the following ranges, based upon the final catalyst composition:

| Component | Minimum Wt. % | Maximum Wt. % |
|---|---|---|
| Silica + alumina + magnesia | 20 | 90 |
| Group IV-B | 0 | 20 |
| Group VI-B | 3 | 35 |
| Group VIII | 3 | 20 |
| Zeolite | 2 | 50 |

In the above composition, the Group IV-B, Group VI-B and Group VIII components are calculated a:

oxides of the components.

When the only hydrogenation component used is a noble metal, the preferred amounts of the components fall within the following ranges, based on the final catalyst composition:

| Component | Minimum Wt. % | Maximum Wt. % |
|---|---|---|
| Silica + alumina + magnesia | 27 | 97, preferably 95 |
| Group IV-B | 0, preferably 2 | 20 |
| Group VIII | 0.05 | 3.0 |
| Zeolite | 2 | 50 |

In the above, the Group IV-B components are calculated as the oxides and the Group VIII noble metal components as the metal.

Compositions with catalytic activity containing both noble metal and nonnoble metal hydrogenation components also form part of this invention. These compositions are similar to those described above for nonnoble metal catalysts, but contain 0.05–3.0 weight percent of the noble metal component, based on the final catalyst and calculated as the metal.

In the above compositions, the preferred crystalline zeolitic molecular sieve is Y-type zeolite. In the final catalyst, a substantial portion of the crystalline zeolitic material preferably is in the hydrogen form, and is substantially free of hydrogenation components.

The matrix component and zeolite component of the final catalyst may be combined in many ways. Examples include separate preparation of dried materials followed by cotabletting, addition of the zeolite component to a washed gel of the matrix component followed by extrusion or tabletting, etc. It is preferred that the catalyst be formulated by a cogelation technique. For example, an acidic solution containing silica; alumina; magnesia; a Group IV-B component, if present; a hydrogenation component; and preferably a detergent, alcohol, polymer, or other organic compound, may be formulated at a pH below 5. Ammonium hydroxide may then be added until the pH reaches about 5. The crystalline zeolitic molecular sieve is added at a pH of about 5. Other components, for example tungsten, if tungsten is to be present in the final catalyst, may also be added at a pH of about 5. The pH can then be increased to 7 by addition, for example, of ammonium hydroxide. If the catalyst is made in this preferred manner, the crystalline zeolitic molecular sieve will be substantially unloaded, i.e., free of any hydrogenation components. The now-neutral solution containing the catalyst may be filtered to recover the catalyst, which may then be washed with, for example, ammonium acetate and dried, for example, at 150°F. to 400°F. and then calcined at a temperature in the range from about 700°F. to about 1300°F.

It is essential to the practice of the invention that the catalyst have a specific gravity less than about 1.8, preferably in the range from about 1.1 to about 1.8, more preferably from about 1.2 to about 1.7. If a catalyst comprising an alumina-silica-magnesia matrix and a zeolitic molecular sieve component is formulated by, for example, cogelation, it will generally have a specific gravity above about 1.9. The catalyst can, however, be prepared with a lower specific gravity by many methods, for example by incorporating a detergent, an alcohol, a polymer, or another organic compound with the components during the formation of the gel, by drying the catalyst in an atmosphere that has a relatively high content of water, by hot-aging the catalyst, i.e., allowing the gel to age in solution before filtering (generally a slurry of 3–5 weight percent solids suspended in $H_2O$), for example at a temperature of 140°F. to about 250°F. for from about 1 to about 8 hours, preferably at a water partial pressure above about 15 psia and at elevated temperature, e.g., 215°F. to 250°F., by grinding a catalyst having an undesirably high specific gravity and forming it into tablets, by combinations of the above methods, or by other methods as well. Preferably a detergent, an alcohol, a polymer, or another organic compound is incorporated with the catalyst components during the formation of the gel.

FEEDSTOCKS

The hydrocarbon feedstocks that are processed by the method of this invention, preferably in a hydrofining, hydrocracking, or combined (single-stage) hydrofining and hydrocracking operation, preferably boil above about 400°F. and more preferably boil within the range from about 550°F. to 1000°F. The nitrogen content of the feedstocks may be within the range from about 10–10,000 ppm. After hydrofining or combined hydrofining and hydrocracking, the nitrogen content of the feedstocks is preferably reduced to below about 50 ppm. Similary, the sulfur content of the feedstocks is generally reduced during hydrofining and/or hydrocracking operation.

PROCESS CONDITIONS

Typical hydrofining, hydrocracking and combined singlestage hydrofining and hydrocracking conditions include, for example, temperatures from about 500°F. to about 900°F., hydrogen pressures from about 200 psig to about 3000 psig, hydrogen flow rates from about 2000 standard cubic feet per barrel of feed to about 20,000 SCF per barrel of feed, and liquid hourly space velocities (LHSV) from about 0.3 to about 5.0.

A preferred embodiment of the present invention comprises a combined (single-stage) hydrofining and hydrocracking process comprising contacting a nitrogen-containing hydrocarbon feedstock with hydrogen and a catalyst of the invention.

Another preferred embodiment of the invention is a hydrocracking process comprising contacting a hydrocarbon feedstock boiling above about 550°F. with hydrogen and a catalyst comprising an alumins-silica-magnesia matrix containing a Group IV-B component selected from the group consisting of titania, zirconia, and hafnia, a Group VI component selected from the group consisting of tungsten and molybdenum, and a Group VIII component selected from the group consisting of platinum, palladium, nickel and cobalt, and an unloaded crystalline zeolitic molecular sieve component, the catalyst having a specific gravity in the range from about 1.2 to about 1.7, in a hydrocracking zone at hydrocracking conditions. Preferably the crystalline zeolitic molecular sieve is a Y-type zeolite.

The invention will be better understood by reference to the illustrative examples which follow.

EXAMPLES

EXAMPLE 1

A catalyst of the prior art, Catalyst A, comprising 10 parts by weight of nickel oxide, 25 parts tungsten trioxide, 27 parts silicon dioxide, 30 parts alumina, 8 parts titanium dioxide, and 10 parts of a Y-zeolite in hydrogen form, said zeolite being free of catalytic metals, was formed by cogelation. Catalyst A was formed by combining nickel chloride, silica, aluminum chloride, and titanium tetrachloride in a water-hydrogen-chloride solution at a pH below 5. The pH was then adjusted to 5 with ammonium hydroxide and the zeolite and ammonium paratungstate were added. Then the pH was adjusted to 7 with more ammonium hydroxide. The resulting precipitate was filtered, washed with 1 percent ammonium acetate, dried at 400°F., and then calcined at 950°F. The particle density of Catalyst A was approximately 1.6 grams per cubic centimeter.

A catalyst of this invention, Catalyst B, was prepared exactly as Catalyst A was prepared except that magnesium chloride was added along with the nickel chloride, silica, aluminum chloride and titanium tetrachloride. Also, the final wash contained 0.1% by weight of a nonionic detergent to lower the catalyst particle density. Catalyst B comprised 11.4 parts nickel oxide, 25.5 parts tungsten trioxide, 22.4 parts silicon dioxide, 22.4 parts alumina, 10.4 parts magnesium oxide, 7.9 parts titania, and 10 parts hydrogenform Y-type zeolite, all of the above parts being by weight. The density of Catalyst B was approximately 1.67 grams per cubic centimeter.

A feedstock with the following properties was hydrofined and hydrocracked in a single-stage operation using Catalyst A, at a total pressure above 2000 psig and with that portion of the product boiling above 550°F. being recycled.

| Feedstock Analysis Volume % | | Distillation °F. | |
|---|---|---|---|
| Paraffins | 7.1 | Start | — 477 |
| Naphthenes | 78.2 | 5% | — 584 |
| Aromatics | 14.7 | 10% | — 610 |
| | | 30% | — 665 |
| | | 50% | — 720 |
| | | 70% | — 761 |
| | | 90% | — 816 |
| | | 95% | — 841 |
| | | End Point | — 888 |

The feedstock contained approximately 0.74 percent sulfur and approximately 2800 ppm nitrogen.

The run conditions were:

| Starting and Average Catalyst Temperature | 730°F. |
|---|---|
| Liquid Hourly Space Velocity | 0.8 |
| Per-Pass Conversion | 49.5% |
| Total Pressure | 2012 psig |

The product obtained had the following characteristics:

| Product | Yield Weight % of Fresh Feed |
|---|---|
| $C_1$-$C_3$ | 2.38 |
| $iC_4$ | 3.99 |
| $nC_4$ | 1.97 |
| $C_5$-180°F. | 10.96 |
| 180°F.-300°F. | 30.74 |
| 300°F.-550°F. | 53.09 |
| $C_5$+ | 94.79 |
| Total | 103.45 |

The 300°F. -550°F. product had the following inspection:

| API Gravity | 41.4 |
|---|---|
| Smoke Point | 25 mm |
| Freeze Point | Below −94°F. |
| Paraffin Content | 17.3% |
| Naphthene Content | 73.6% |
| Aromatic Content | 9.1% |

The ASTM D-86 distillation of the product showed a 10% point of 349°F., a 50% point of 398°F., and a 90% point of 470°F.

Catalyst B was used to hydrofine and hydrocrack, in a single-step operation at 2000 psig and with that portion of the product boiling above 550°F. being recycled, a feed having the following properties:

| Analysis of Feed Volume % | | Distillation °F. | |
|---|---|---|---|
| Paraffins | 6.1 | Start | — 450 |
| Naphthenes | 78.2 | 5% | — 546 |
| Aromatics | 15.7 | 10% | — 590 |
| | | 30% | — 653 |
| | | 50% | — 703 |
| | | 70% | — 761 |
| | | 90% | — 820 |
| | | 95% | — 837 |
| | | End Point | — 888 |

The feedstock had approximately 0.81 percent sulfur and approximately 2600 ppm nitrogen. This feedstock is esentially identical with the feedstock used to test Catalyst A.

The run conditions were as follows:

| Starting and Average Catalyst Temperature | 723°F. |
|---|---|
| Liquid Hourly Space Velocity | 1.00 |
| Per-Pass Conversion | 48.4% |
| Total Pressure | 1999 psig |

The product yields were as follows:

| Product | Yield Weight % of Fresh Feed |
|---|---|
| $C_1$-$C_3$ | 1.78 |
| $iC_4$ | 3.42 |
| $nC_4$ | 1.63 |
| $C_5$-180°F. | 10.17 |
| 180°-300°F. | 26.30 |
| 300°F.-550°F. | 58.91 |
| $C_5$+ | 95.38 |
| Total | 103.39 |

The 300°F.-550°F. product had the following inspection

| API Gravity | 39.5 |
|---|---|
| Smoke Point | 21 mm |
| Freeze Point | Below −94°F. |
| Paraffins | 16.7 Wt. % |
| Naphthenes | 71.6 Wt. % |
| Aromatics | 11.7 Wt. % |

ASTM D-86 distillation 10% point, 356°F; 50% point, 418°F., 90% point, 500°F.

From these data it can be seen that the products produced using Catalysts A and B were comparable.

Further, the catalyst containing magnesia, Catalyst B, was superior to the catalyst without magnesia, Catalyst A, in starting temperature. The actual starting temperature was 723°F. for the catalyst containing magnesia and 730°F. for the catalyst without magnesia, yet the catalyst containing magnesia was used at a liquid hourly space velocity of 1.0 whereas the catalyst without magnesia was used at a liquid hourly space velocity of 0.8. If the liquid hourly space velocity had been 1.0 in each case, the difference in starting temperature would not have been 7°F., but would instead have been about 14°F. FIG. 1 illustrates that the starting temperature differential is maintained after considerable time on-stream.

Thus, Catalyst B, the catalyst of the invention, is superior to Catalyst A in that it is substantially 14°F. more active at 2000 psig and at a space velocity of 1.0.

EXAMPLE 2

Catalyst C was prepared with a composition very similar to Catalyst B of Example 1, by the same procedure as Catalyst B except that no processing step was included to lower the catalyst particle density. Catalyst C comprised 10.2 parts by weight nickel oxide, 22.8 parts tungsten oxide, 30 parts silicon dioxide, 15 parts alumina, 15 parts magnesium oxide, 7 parts titania, and 10 parts hydrogen form of Y zeolite. The particle density of Catalyst C was 1.99 grams per cubic meter. Catalyst C particle density is nearly 20% greater than the particle density of Catalyst B.

Catalyst C was compared to Catalyst A of Example 1 for hydrocracking the same test feed used for Catalyst A in Example 1. In these tests the liquid flow was once-through; i.e., the unconverted feed was not recycled back through the reactor. Test conditions and results were as follows:

|  | Catalyst | | | |
| --- | --- | --- | --- | --- |
|  | A | A | C | C |
| Run length, hours | 20 | 250 | 20 | 250 |
| LHSV, l/hr. | 1.0 | 1.0 | 1.0 | 1.0 |
| Total pressure, psig | 1,300 | 1,300 | 1,300 | 1,300 |
| Hydrogen, SCF/B. | 10,000 | 10,000 | 10,000 | 10,000 |
| Catalyst temperature, °F. | 768 | 785 | 764 | 790 |
| Conversion to 550°F.- products, LV% of feed | 63 | 63 | 59 | 59 |
| Temperature for 63% conversion | 768 | 785 |  |  |
| Estimated temperature for 63% conversion |  |  | 770 | 796 |
| Temperature change needed for constant conversion, °F./hr. | 0.07 | | 0.11 | |

It can be seen that the temperature required for 63% conversion was 2°F. higher for Catalyst C than for Catalyst A after 20 hours' operation. In addition, the temperature increase per hour required to maintain constant conversion was higher for Catalyst C then Catalyst A. Thus, after 250 hours' operation, the temperature required for 63% conversion for Catalyst C was 11°F. higher than for Catalyst A.

It is clear from these results that high-density Catalyst C is inferior in both catalytic activity and stability to Catalyst A. However, lower-density Catalyst B (of similar composition to Catalyst C) was shown to be superior to Catalyst A in Example 1. Thus, to achieve superior performance with the magnesia-containing catalysts, it is necessary that the particle density be less than about 1.8 g./cc.

It is apparent that many widely different embodiments of this invention may be made without departing from the scope and spirit thereof; and, therefore, it is not intended to be limited except as indicated in the appended claims.

What is claimed is:

1. A catalytic composition of matter comprising a matrix including alumina, silica and magnesia, associated with a hydrogenation component and, dispersed in particulate form in said matrix, crystalline zeolitic molecular sieve substantially free of hydrogenation components, said composition of matter having a specific gravity less than about 1.8.

2. A catalytic composition of matter as in claim 1, wherein said composition of matter further comprises a Group IV-B component selected from the group consisting of titania, zirconia, and hafnia, and said hydrogenation component comprises a Group VI component selected from the group consisting of tungsten and molybdenum, and a Group VIII component selected from the group consisting of nickel and cobalt.

3. A catalytic composition of matter as in claim 2 wherein the alumina is present in an amount of from 2–96 weight percent; the silica is present in an amount of from 2–96 weight percent; the magnesia is present in an amount of from 2–50 weight percent, the respective weights of said alumina, said silica and said magnesia based on said matrix, said matrix being present in the final catalyst in an amount of from 20 to 90% by weight, based on the final catalyst; the Group IV-B component is present in an amount from 2–20 weight percent, calculated as the oxide, based on the final catalyst; the Group VI component is present in an amount of from 3–35 weight percent, calculated as the oxide, based on the final catalyst; the Group VIII component is present in an amount of from 3–20 weight percent, calculated as the oxide, based on the final catalyst; and the crystalline zeolitic molecular sieve is present in an amount from 2–50 weight percent, based on the final catalyst.

4. A catalytic composition of matter comprising: (1) a matrix including alumina, silica and magnesia, said alumina present in an amount of from 2–96 weight percent, said silica present in an amount of from 2–96 weight percent, said magnesia present in an amount of from 2–50 weight percent, the respective weights of said alumina, said silica and said magnesia based on said matrix, said matrix being present in the final catalyst in an amount of from 20–90% by weight, based on the final catalyst; (2) a hydrogenation component selected from the group consisting of platinum and palladium, present in an amount of from 0.05 to 3 weight percent, calculated as metal, based on the final catalyst; (3) a crystalline zeolitic molecular sieve substantially free of hydrogenation components, said molecular sieve being present in an amount of from 2–50 weight percent, based on the final catalyst; said composition of matter having a specific gravity in the range of from about 1.1 to 1.8.

* * * * *